US011995569B2

(12) United States Patent
Sodani et al.

(10) Patent No.: US 11,995,569 B2
(45) Date of Patent: *May 28, 2024

(54) ARCHITECTURE TO SUPPORT TANH AND SIGMOID OPERATIONS FOR INFERENCE ACCELERATION IN MACHINE LEARNING

(71) Applicant: Marvell Asia Pte, Ltd., Singapore (SG)

(72) Inventors: Avinash Sodani, San Jose, CA (US); Ulf Hanebutte, Gig Harbor, WA (US); Chia-Hsin Chen, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 169 days.

This patent is subject to a terminal disclaimer.

(21) Appl. No.: 17/223,921

(22) Filed: Apr. 6, 2021

(65) Prior Publication Data

US 2021/0248497 A1 Aug. 12, 2021

Related U.S. Application Data

(63) Continuation of application No. 16/419,994, filed on May 22, 2019, now Pat. No. 10,997,510, which is a
(Continued)

(51) Int. Cl.
*G06N 5/04* (2023.01)
*G06F 9/50* (2006.01)
(Continued)

(52) U.S. Cl.
CPC ............. *G06N 5/04* (2013.01); *G06F 9/5027* (2013.01); *G06F 17/16* (2013.01); *G06N 20/00* (2019.01)

(58) Field of Classification Search
CPC ........ G06F 9/5027; G06F 17/16; G06F 7/548; G06F 7/556; G06F 9/3879; G06F 17/10;
(Continued)

(56) References Cited

U.S. PATENT DOCUMENTS 4,982,291 A 1/1991 Kurahashi et al.
5,329,611 A 7/1994 Pechanek et al.
(Continued)

FOREIGN PATENT DOCUMENTS

GB 2604142 A 8/2022
KR 20210052188 A 5/2021
(Continued)

OTHER PUBLICATIONS

Ceze, L., et al. Colorama: Architectural Support for Data-Centric Synchronization, 2007, IEEE, pp. 134-144 (Year: 2007).
(Continued)

*Primary Examiner* — Tan V Mai

(57) ABSTRACT

A processing unit to support inference acceleration for machine learning (ML) comprises an inline post processing unit configured to accept and maintain one or more lookup tables for performing a tanh and/or sigmoid operation/ function. The inline post processing unit is further configured to accept data from a set of registers configured to maintain output from a processing block instead of streaming the data from an on-chip memory (OCM), perform the tanh and/or sigmoid operation on each element of the data from the processing block on a per-element basis via the one or more lookup tables, and stream post processing result of the per-element tanh and/or sigmoid operation back to the OCM after the tanh and/or sigmoid operation is complete.

34 Claims, 9 Drawing Sheets

Related U.S. Application Data continuation-in-part of application No. 16/226,550, filed on Dec. 19, 2018, now Pat. No. 10,896,045.

(60) Provisional application No. 62/675,076, filed on May 22, 2018.

(51) Int. Cl.
*G06F 17/16* (2006.01)
*G06N 20/00* (2019.01)

(58) Field of Classification Search
CPC ...... G06F 9/30174; G06N 5/04; G06N 20/00; G06N 3/048
USPC .......................................... 708/607, 276–277
See application file for complete search history.

(56) References Cited

U.S. PATENT DOCUMENTS

| | | | |
|---|---|---|---|
| 5,481,487 A | 1/1996 | Jang et al. | |
| 5,948,098 A | 9/1999 | Leung et al. | |
| 6,128,638 A | 10/2000 | Thomas | |
| 6,282,583 B1 | 8/2001 | Pincus et al. | |
| 6,415,377 B1 | 7/2002 | Wolf et al. | |
| 6,577,312 B2 | 6/2003 | Deering et al. | |
| 6,640,262 B1 | 10/2003 | Uppunda et al. | |
| 7,089,380 B1 | 8/2006 | Schober | |
| 7,191,163 B2 | 3/2007 | Herrera et al. | |
| 7,509,363 B2 * | 3/2009 | Clifton | G06F 1/0356 708/277 |
| 7,809,663 B1 | 10/2010 | Birch et al. | |
| 7,840,914 B1 | 11/2010 | Agarwal et al. | |
| 7,853,752 B1 | 12/2010 | Agarwal et al. | |
| 7,912,883 B2 * | 3/2011 | Hussain | G06F 7/556 708/277 |
| 8,200,728 B2 * | 6/2012 | Michaels | G06F 1/03 708/276 |
| 8,200,940 B1 | 6/2012 | Lindholm | |
| 8,209,703 B2 | 6/2012 | Yee et al. | |
| 8,504,954 B1 | 8/2013 | Arnold | |
| 8,583,896 B2 | 11/2013 | Cadambi et al. | |
| 8,738,860 B1 | 5/2014 | Griffin et al. | |
| 8,838,663 B2 | 9/2014 | Tang et al. | |
| 9,015,217 B2 | 4/2015 | Arnold et al. | |
| 9,753,695 B2 * | 9/2017 | Mortensen | G06F 7/57 |
| 9,954,771 B1 | 4/2018 | Levy et al. | |
| 10,161,786 B2 | 12/2018 | Chang et al. | |
| 10,296,556 B2 | 5/2019 | Zhou | |
| 10,305,766 B1 | 5/2019 | Zhang et al. | |
| 10,614,357 B2 * | 4/2020 | Lie | G06N 3/08 |
| 10,884,736 B1 | 1/2021 | Farooqui | |
| 11,016,801 B1 | 5/2021 | Sodani et al. | |
| 11,106,432 B2 | 8/2021 | Mangnall et al. | |
| 11,604,799 B1 | 3/2023 | Bigdelu et al. | |
| 2003/0163671 A1 | 8/2003 | Gschwind et al. | |
| 2004/0153501 A1 | 8/2004 | Yamashita et al. | |
| 2007/0122347 A1 | 5/2007 | Statnikov et al. | |
| 2008/0040577 A1 | 2/2008 | Nemirovsky et al. | |
| 2009/0097480 A1 | 4/2009 | Curtis et al. | |
| 2009/0158005 A1 | 6/2009 | Carmichael | |
| 2010/0017420 A1 | 1/2010 | Archer et al. | |
| 2011/0219208 A1 | 9/2011 | Asaad et al. | |
| 2011/0307890 A1 | 12/2011 | Achilles et al. | |
| 2013/0101035 A1 | 4/2013 | Wang et al. | |
| 2013/0117521 A1 | 5/2013 | Li et al. | |
| 2014/0007098 A1 | 1/2014 | Stillwell, Jr. et al. | |
| 2015/0019836 A1 | 1/2015 | Anderson et al. | |
| 2015/0046753 A1 | 2/2015 | Cecka et al. | |
| 2015/0106568 A1 | 4/2015 | Feldman et al. | |
| 2015/0309808 A1 | 10/2015 | Nandy et al. | |
| 2015/0347012 A1 | 12/2015 | Dewitt et al. | |
| 2016/0132272 A1 | 5/2016 | Iwashita | |
| 2016/0162402 A1 | 6/2016 | Woolley, Jr. et al. | |
| 2016/0170916 A1 | 6/2016 | Deshpande et al. | |
| 2016/0224465 A1 | 8/2016 | Morad et al. | |
| 2017/0068571 A1 | 3/2017 | Lu et al. | |
| 2017/0083313 A1 | 3/2017 | Sankaralingam et al. | |
| 2017/0228345 A1 | 8/2017 | Gupta et al. | |
| 2017/0351642 A1 | 12/2017 | Omtzigt | |
| 2017/0353397 A1 | 12/2017 | Che | |
| 2017/0357483 A1 | 12/2017 | Nicol et al. | |
| 2017/0364694 A1 | 12/2017 | Jacob et al. | |
| 2018/0046458 A1 | 2/2018 | Kuramoto | |
| 2018/0047126 A1 | 2/2018 | Falkenstern et al. | |
| 2018/0068019 A1 | 3/2018 | Novikoff et al. | |
| 2018/0114114 A1 | 4/2018 | Molchanov et al. | |
| 2018/0260220 A1 | 9/2018 | Lacy et al. | |
| 2018/0286016 A1 | 10/2018 | Bar-On et al. | |
| 2018/0293782 A1 | 10/2018 | Benthin et al. | |
| 2018/0300617 A1 | 10/2018 | McBride et al. | |
| 2018/0307980 A1 | 10/2018 | Barik et al. | |
| 2018/0315158 A1 | 11/2018 | Nurvitadhi et al. | |
| 2018/0341484 A1 | 11/2018 | Fowers et al. | |
| 2018/0349388 A1 | 12/2018 | Skiles et al. | |
| 2019/0121641 A1 | 4/2019 | Knowles et al. | |
| 2019/0121679 A1 | 4/2019 | Wilkinson et al. | |
| 2019/0138210 A1 | 5/2019 | Lindholm | |
| 2019/0146455 A1 | 5/2019 | Beylkin et al. | |
| 2019/0147471 A1 | 5/2019 | McKelvey, Jr. et al. | |
| 2019/0171604 A1 | 6/2019 | Brewer | |
| 2020/0082198 A1 | 3/2020 | Yao et al. | |
| 2020/0242734 A1 | 7/2020 | Wang et al. | |
| 2021/0133911 A1 | 5/2021 | Yao et al. | |
| 2021/0158155 A1 | 5/2021 | Zhang et al. | |
| 2021/0216874 A1 | 7/2021 | Jegou et al. | |
| 2021/0319317 A1 | 10/2021 | Power et al. | |
| 2021/0390076 A1 | 12/2021 | Fang et al. | |
| 2022/0067513 A1 | 3/2022 | Stevens et al. | |
| 2022/0076110 A1 | 3/2022 | Shao et al. | |
| 2022/0207783 A1 | 6/2022 | Kwong et al. | |
| 2022/0261650 A1 | 8/2022 | Zhao et al. | |
| 2022/0405566 A1 | 12/2022 | Winterbottom et al. | |
| 2023/0024035 A1 | 1/2023 | Thuerck et al. | |
| 2023/0071931 A1 | 3/2023 | Huang et al. | |
| 2023/0106651 A1 | 4/2023 | Xi et al. | |
| 2023/0252275 A1 | 8/2023 | Nez et al. | |

FOREIGN PATENT DOCUMENTS

| | | |
|---|---|---|
| WO | 0245385 A2 | 6/2002 |
| WO | 2018222904 A1 | 12/2018 |

OTHER PUBLICATIONS

NanoMesh: An Asynchronous Kilo-Core System-on-Chip, Tse, et al. 2013 19th IEEE International Symposium on Asynchronous Circuits and Systems.

Brewer, "Instructions Set Innovations for the Convey HC-1 Computer", 2010, pp. 70-79, Year: 2010.

Seng, et al. "Reducing Power with Dynamic Critical Path Information", Jan. 1999, pp. 114-123; Year: 1999.

Gelado, et al., "An Asymmetric Distributed Shared Memory Model for Heterogeneous Parallel Systems", 2010 (Year: 2010) 12 pages.

* cited by examiner

- if $x_q < 0$
  - index i = absolute value of $x_q$
  - T[i] = Table lookup with index i
  - $Y_q = -T[i]$
- Else (i.e. $x_q >= 0$)
  - index i = $x_q$
  - T[i] = Table lookup with index i
  - $Y_q = T[i]$

- if $x_q < 0$
  - index i = absolute value of $x_q$
  - T[i] = Table lookup with index i
  - $Y_q = -T[i] + 127$
- Else (i.e. $x_q >= 0$)
  - index i = $x_q$
  - T[i] = Table lookup with index i
  - $Y_q = T[i] + 127$

```
def fp16_tanh(x):
    if x < 0:
        return -(2* _fp16_positive_sigmoid(-2*x) -1.)
    elif x == 0:
        return 0
    if x > 0:
        return 2* _fp16_positive_sigmoid(2*x) -1.

def fp16_sigmoid(x):
    if x < 0:
        return - _fp16_positive_sigmoid(-x) + 1.
    elif x == 0:
        return 0.5
    if x > 0:
        return _fp16_positive_sigmoid(x)
```

FIG. 7A

```
def _fp16_positive_sigmoid(x):
    s,e,m = _get_sign_exp_mantissa(x)
    if e < 12:
        #pass through region
        return x/4. +.5
    if e >= 18:
        #saturation
        return 1.
    else:
        index = _table_index(e,m)
        return np.float16( x * O[index] + B[index])
```

FIG. 7B

ARCHITECTURE TO SUPPORT TANH AND SIGMOID OPERATIONS FOR INFERENCE ACCELERATION IN MACHINE LEARNING

CROSS-REFERENCE TO RELATED APPLICATIONS

This application claims the benefit of U.S. Provisional Patent Application No. 62/675,076, filed May 22, 2018, which is incorporated herein in its entirety by reference.

This application is a continuation application of U.S. patent application Ser. No. 16/419,994, filed on May 22, 2019, which is a continuation-in-part of U.S. patent application Ser. No. 16/226,550, filed Dec. 19, 2018, and entitled "Architecture for dense operations in machine learning inference engine," which are incorporated herein in its entirety by reference.

BACKGROUND

Applied Machine Learning (ML) is a booming field that utilizes a cascade of layers of nonlinear processing units and algorithms for feature extraction and transformation with a wide variety of usages and applications. ML typically involves two phases, training, which uses a rich set of training data to train a plurality of machine learning models, and inference, which applies the trained machine learning models to actual applications. Each of the two phases poses a distinct set of requirements for its underlying infrastructures. Various infrastructures may be used, e.g., graphics processing unit (GPU), a central processing unit (CPU), a Field Programmable Gate Array (FPGA), an Application Specific Integrated Circuit (ASIC), etc. Specifically, the training phase focuses on, as a non-limiting example, GPU or ASIC infrastructures that scale with the trained models and retraining frequency, wherein the key objective of the training phase is to achieve high performance and reduce training time. The inference phase, on the other hand, focuses on infrastructures that scale with the applications, user, and data, and the key objective of the inference phase is to achieve energy (e.g., performance per watt) and capital (e.g., return on investment) efficiency.

Inference phase of ML is usually very computationally and data intensive. Unfortunately, as the input data and model sizes grow, data movement becomes a bottleneck and data processing increases because in order to perform simple processing, three operations or instructions are performed for each data, e.g., load, processing, and store. As the amount of data grows, performing these three operations or instructions becomes burdensome. Moreover, the current computing architecture is not scalable and are not well suited for ML and its applications, since a lot of time goes in loading and storing the data in comparison to processing the data.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 7A-B depict examples of detailed steps to calculate the tanh and sigmoid functions for floating numbers according to one aspect of the present embodiments.

DETAILED DESCRIPTION

Figure 1:
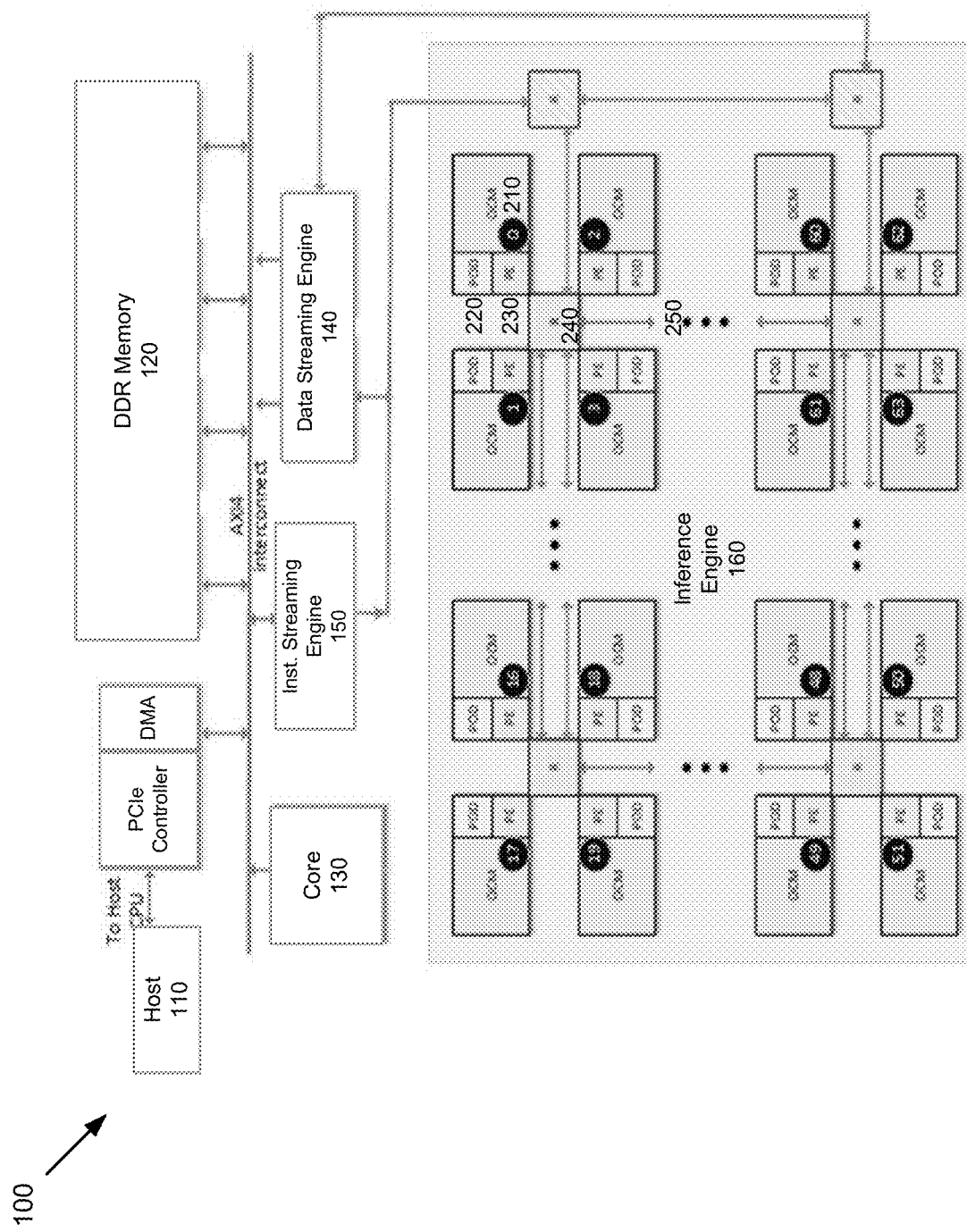
FIG. 1 depicts an example of diagram of a hardware-based programmable architecture configured to support inference acceleration for machine learning according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

FIG. 1 depicts an example of a diagram of a hardware-based programmable system/architecture 100 configured to support inference acceleration for machine learning. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

Each of the engines in the architecture 100 is a dedicated hardware block/component including one or more microprocessors and on-chip memory units storing software instructions programmed by a user for various machine learning operations. When the software instructions are executed by the microprocessors, each of the hardware components becomes a special purposed hardware component for practicing certain machine learning functions as discussed in detail below. In some embodiments, the architecture 100 is on a single chip, e.g., a system-on-chip (SOC).

In the example of FIG. 1, the architecture 100 may include a host 110 coupled to a memory (e.g., DDR) 120 and a core engine 130 via a PCIe controller and/or a direct memory access (DMA) module. The host 110 is a processing unit configured to receive or generate data to be analyzed and/or inferred by architecture 100 via machine learning. The DDR memory 120 is coupled to a data streaming engine 140 configured to transfer/stream data between the DDR memory 120 and on-chip memory (OCM) 210 of an inference engine 160 discussed below via DMA (DDR-to-OCM DMA or DoD). The core 130 is a processing engine configured to receive and interpret a plurality of ML commands from the host 110 into instructions for a ML operation. The core 130 is also configured to process a plurality of performance non-critical operations, e.g., data/instruction preparatory work, data collection, data mapping, etc. The core 130 is coupled to an instruction-streaming engine 150, which accepts instructions destined for the inference engine 160 from the core 130 and distributes the instructions to the appropriate units within the inference engine 160. The inference engine 160 is configured to perform dense and sparse operations on received stream of data, e.g., to identify a subject in an image, by using the training data and executing the programming instructions received from the instruction-streaming engine 150.

In some embodiments, the inference engine 160 includes a two-dimensional computing array of processing tiles, e.g., tiles 0, . . . , 63, arranged in, e.g., 8 rows by 8 columns. Each processing tile (e.g., tile 0) includes at least one on-chip memory (OCM) e.g., 210, one POD engine (or POD), e.g., 220, and one processing engine/element (PE), e.g., 230. Here, the OCMs in the processing tiles are configured to receive data from the data streaming engine 140 in a streaming fashion. The OCMs enable efficient local access to data per processing tile. The PODs are configured to perform dense or regular computations on the received data in the OCMs, e.g., matrix operations such as multiplication, matrix manipulation, tanh, sigmoid, etc., and the PEs are configured to perform sparse/irregular computations and/or complex data shape transformations of the received data in the OCMs, e.g., memory transpose, addition operation, operations on irregular data structures (such as trees, graphs, and priority queues), respectively. Both the PODs and the PEs can be programmed according to the programming instructions received from the instruction-streaming engine 150. Accordingly, the data is received and processed by each processing tile as an input data stream from the DDR memory 120 and the result is output by each processing tile as a stream of data to the DDR memory 120.

In some embodiments, a plurality of (e.g., four) processing tiles together form a processing block or quad, e.g., processing tiles 0-3 forms processing block 250, wherein the processing tiles within each processing block are coupled to one another via a routing element 240. In some embodiments, all the routing elements are connected together as a mesh interconnect to connect the processing blocks in the same row or column as a two-dimensional array. It is appreciated that the number and/or types of components within each processing tile, the formation of the processing blocks, the number of processing tiles in each processing block, and the number of processing blocks in each row and column of the inference engine 160 as shown in FIG. 1 are exemplary and should not be construed as limiting the scope of the embodiments. In some embodiments, the same number of PE and POD may be used for each tile, and the same number of blocks may be used in each row and column in order to provide flexibility and scalability.

Figure 2:
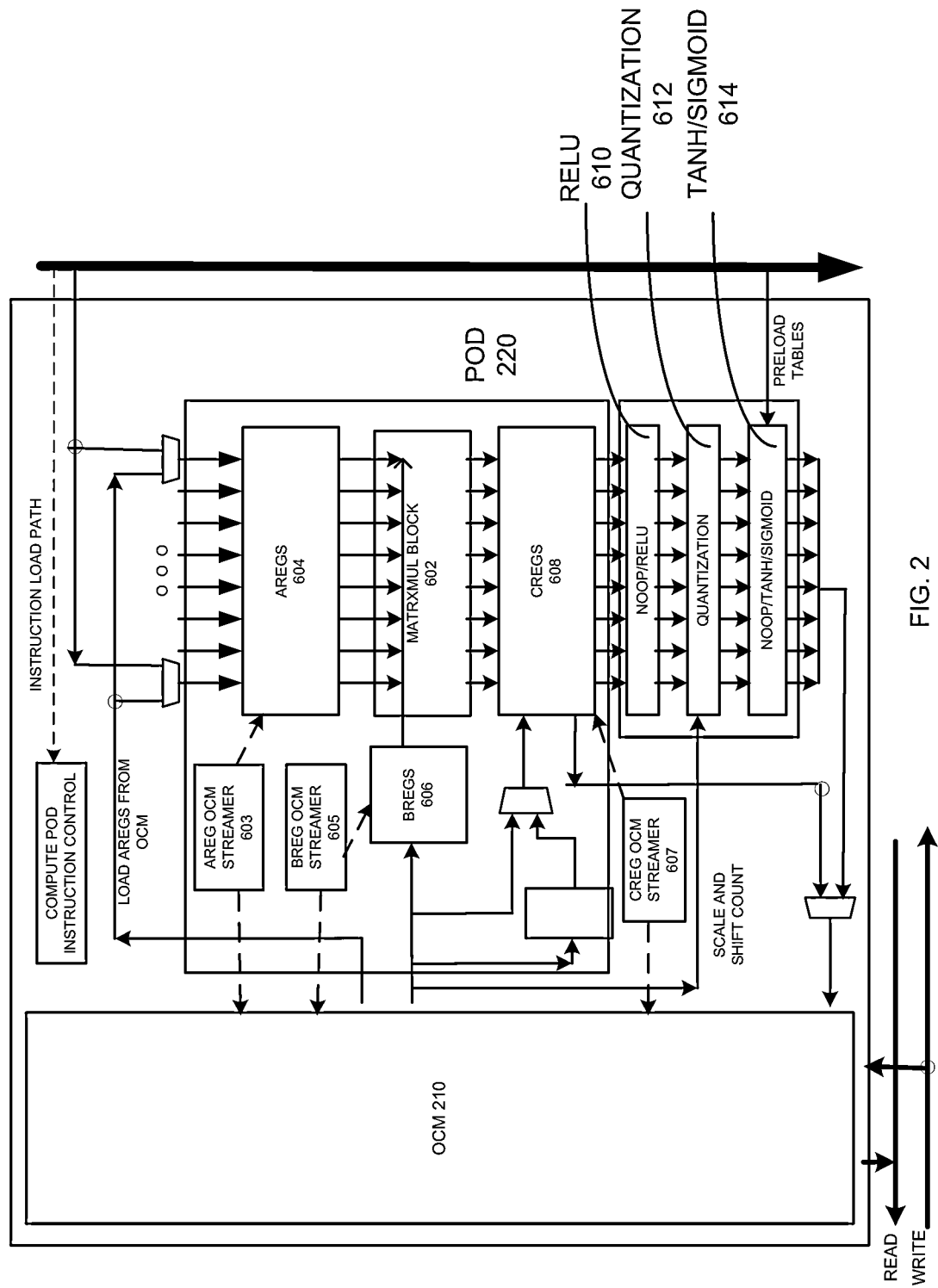
FIG. 2 depicts a diagram of an example of the micro-architecture of the POD engine in FIG. 1 according to one aspect of the present embodiments.

In the example of FIG. 1, the POD engine 220 is configured to perform dense-matrix computation such as matrix-matrix multiply and element-wise matrix operations on data in the OCM 210. FIG. 2 depicts a diagram of an example of the microarchitecture of the POD engine 220. It is appreciated that the number of components, the size of the components, and the number of bits, matrix sizes, etc. shown in FIG. 2 are for illustrative purposes and not intended to limit the scope of the embodiments. In the example of FIG. 2, the POD 220 includes a matrix multiplication block 602, which is a two-dimensional array having X number of rows and Y number of columns, wherein each element/cell in the array has a certain number of registers maintaining data streamed to and from the OCM 210. The matrix multiplication block 602 is configured to multiply two matrices, matrix A of X number of rows and Z number of columns and matrix B of Z number of rows and Y number of columns to generate a matrix C of X number of rows and Y number of columns. In some embodiments, the matrix multiplication block 602 is fed by A registers 604 and B registers 606, which hold the two matrices, A and B, for multiplication by the matrix multiplication block 602, respectively. The matrix data are written into A registers 604 and B registers 606 from the OCM 210 by Areg OCM streamer 603 and Breg OCM streamer 605, respectively. Partial result of the multiplication of the two matrices by the matrix multiplication block 602 is accumulated and saved in C registers 608, which is then streamed to the OCM 210 via Creg OCM streamer 607. In some embodiments, the matrix multiplication block 602 and the register streamers are programmed using instructions from the instruction streaming engine 150, wherein the instructions specify the address, length and stride of the stream to be loaded from the OCM 210 and the matrix multiplication operations performed by the matrix multiplication block 602. In some embodiments, the data loading instructions are stalled when the registers and/or buffers are full and will resume when there is space to accommodate the data.

During matrix multiplication, the POD engine 220 is configured to perform a plurality of inline post processing operations immediately on output from the matrix multiplication block 602 saved in the C registers 608 without having to transmit and save the output to the OCM 210 first and then read the C matrix from the OCM 210 again for these post matrix multiplication operations. By bypassing the roundtrip to the OCM 210, the inline post processing operations following the matrix multiplication saves time and improves efficiency of the ML operation by the inference engine 160. As shown by the example of FIG. 2, the inline post processing operations supported by the POD engine 220 include but are not limited to a rectified linear operation by an inline rectified linear unit (ReLU) 610, a quantization operation by an inline quantization unit 612, and Tanh or Sigmoid operation by an inline tanh/sigmoid unit 614.

Tanh and Sigmoid

In some embodiments, the tanh/sigmoid unit 614 of the POD engine 220 is configured to perform tanh and/or sigmoid operations/functions on each element of the output from the matrix multiplication block 602 on per-element basis before writing the output to the OCM 210. In some embodiments, the tanh/sigmoid unit 614 is configured to perform the per-element operations on the output via a lookup table, wherein values of the lookup table can be preloaded into, accepted and maintained by the tanh/sigmoid unit 614 from the memory 120 by the core 130. The tanh/sigmoid unit 614 is configured to determine a corresponding value of the tanh or sigmoid operation by looking up a value x from the lookup table.

In some embodiments, since different sections and models may be used to approximate the per-element operations based on numerical analysis, the tanh/sigmoid unit 614 is configured to utilize multiple lookup tables for the per-element operations. Specifically, the tanh/sigmoid unit 614 is configured to divide the tanh or sigmoid function into multiple sections, where each section may be represented by a curve that is extrapolated based on a specific lookup table. The tanh/sigmoid unit 614 may then determine value of the tanh and/or sigmoid function by referencing a specific lookup table corresponding to a section associated with a known x value and fetch the value of the tanh and/or sigmoid function from the corresponding lookup table accordingly.

Figures 3A, 3B:
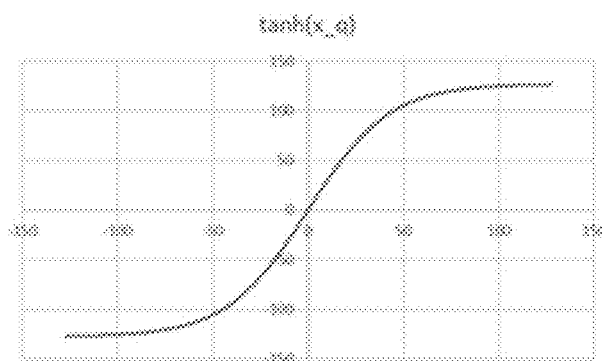
FIG. 3A depicts an example of pseudo-code for tanh operation using a single lookup table under integer numbers.
FIG. 3B is an example of a diagram depicting input and output range of the tanh operation under integer numbers according to one aspect of the present embodiments.
Figures 4A, 4B:
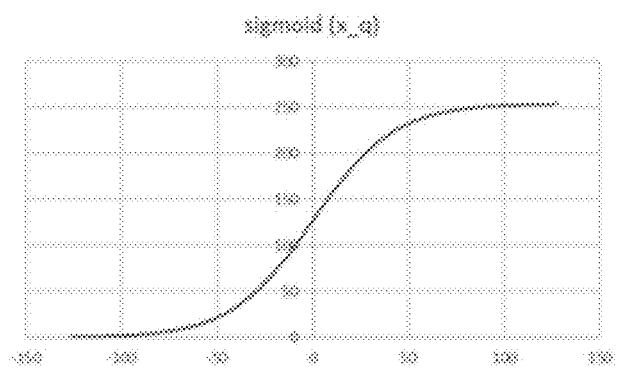
FIG. 4A depicts an example of pseudo-code for sigmoid operation using a single lookup table for integer numbers.
FIG. 4B is an example of diagram depicting input and output range of the sigmoid operation under integer numbers according to one aspect of the present embodiments.

For integer input values (e.g., Int. 8), in some embodiments, the tanh/sigmoid unit 614 is configured to utilize a single lookup table to implement the tanh and/or the sigmoid operation/function by taking advantage of the operator symmetries and relationship of the tanh and/or sigmoid function. For a non-limiting example, the tanh/sigmoid unit 614 may implement the tanh and sigmoid functions based on a single lookup table with 128 entries for both functions, wherein input to the tanh/sigmoid operations/functions is in the range of −127 to 127. In the example of the tanh operation, the output activation after the tanh operation is performed will be in the range of −127 to 127. FIG. 3A depicts an example of pseudo-code for tanh operation using a single lookup table for integer numbers, wherein T is the lookup table, i is in the range of 0 to 127, input to the tanh function is denoted as $x_q$ and output from the than function is denoted as $y_q$. FIG. 3B is an example of a diagram depicting input and output range of the tanh operation under integer numbers. FIG. 4A depicts an example of pseudo-code for sigmoid operation using a single lookup table for integer numbers, wherein T is the lookup table, i is in the range of 0 to 127, input to the sigmoid function is denoted as x q and output from the than function is denoted as $y_q$. FIG. 4B is an example of diagram depicting input and output range of the sigmoid operation under integer numbers.

For floating point input values (e.g., fp16), in some embodiments, the tanh/sigmoid unit 614 is configured to implement each of the tanh and/or the sigmoid functions as a piece-wise linear approximation for a positive input range/ region with a lookup table based on the exponent and mantissa values of the floating point input x. In some embodiments, the tanh/sigmoid unit 614 is configured to represent the tanh function using the sigmoid function so that only a single table representing the sigmoid function is needed. Similar to the implementation for integer numbers, the tanh/sigmoid unit 614 is configured to take advantage of the symmetry of the tanh and sigmoid functions to obtain function values for the negative input range.

Figure 5A:
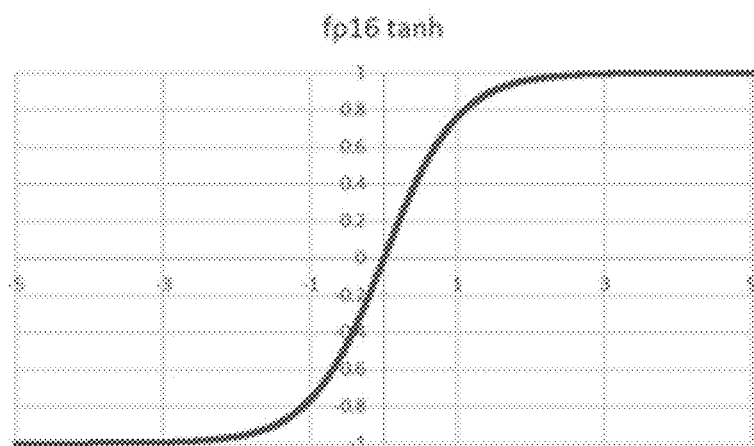
FIG. 5A is an example of diagram depicting input and output range of the tanh operation under floating numbers.
Figure 5B:
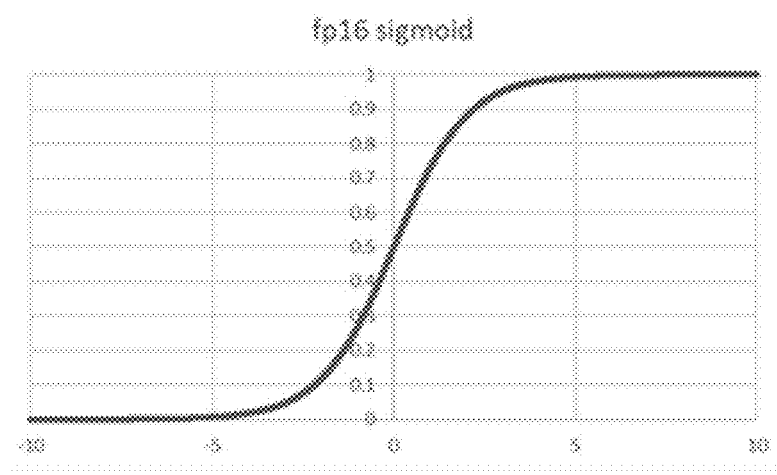
FIG. 5B is an example of diagram depicting the sigmoid function under floating numbers according to one aspect of the present embodiments.
Figure 6:
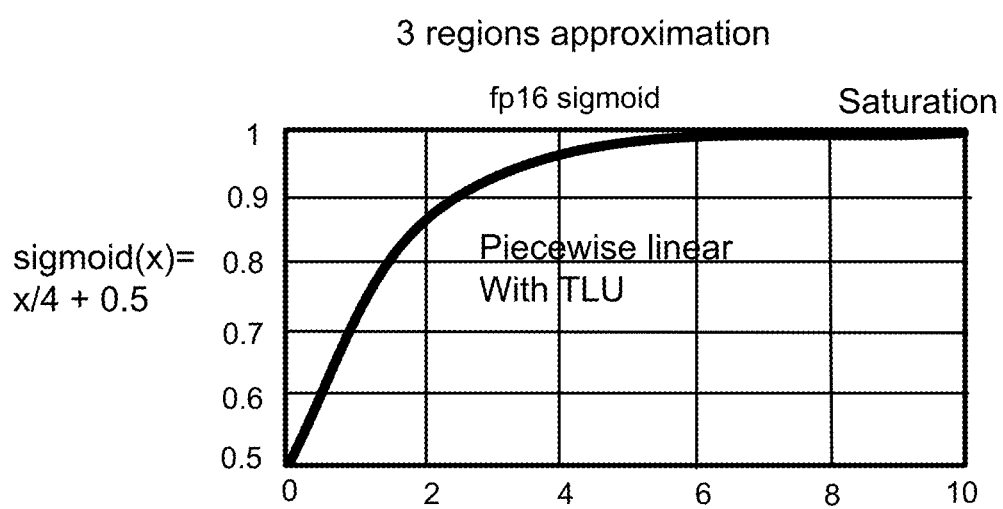
FIG. 6 depicts a diagram of an example of dividing the sigmoid function under floating numbers into three regions for the positive input range according to one aspect of the present embodiments.

In some embodiments, the tanh/sigmoid unit 614 is further configured to divide the positive region of the functions into one or more of path-through, lookup and saturation regions for floating input values. In the example of the tanh operation, tanh(x)=2*sigmoid(2x)+1 for the positive input range of x, and the tanh/sigmoid unit 614 is configured to use the symmetry of tanh function to obtain tanh(−x)=−tanh(x) for the negative input range. FIG. 5A is an example of diagram depicting input and output range of the tanh operation under floating numbers. In the example of the sigmoid operation for floating numbers, the tanh/sigmoid unit 614 is configured to divide the sigmoid function into three regions for the positive input range of x by taking advantage of the symmetry of the function as shown by the example depicted in FIG. 6. Within the path-through region where exponent of x<12, sigmoid(x)=x/4+0.5; For the saturation region where exponent of x>18, sigmoid(x)=1; and the tanh/sigmoid unit 614 is configured to use piece-wise linear approximations for the region between the path-through region and the saturation region wherein the base (B) and slope (D) values are obtained by a table lookup with the index being calculated as a function of exponent and mantissa values of x. Here, the B and D values in the table are such that the value of x is used in calculating the linear approximation of sigmoid function as D*x+B, even if the linear approximation is for a sub-region. As such, there is no need for calculating a local relative value for the sub-region. FIG. 5B is an example of diagram depicting the entire sigmoid function under floating numbers in the input range of −10 to 10. Here, the saturation limits are set to −8 and 8 respectively, as they align with an exponent step in the floating-point representation and can easily be identified. The function saturated to 0 for values of x smaller than −8 and saturates to 1 for x values larger than 8.

FIG. 7A depicts an example of detailed steps to calculate the tanh and sigmoid functions for floating numbers, wherein both the fp16_tanh and fp16_sigmoid module call the _fp16_positive_sigmoid module depicted in FIG. 7B, which in turn calls a helper function to extract the sign, exponent and mantissa bits of the input value x and a function to calculate the table index based on the extracted exponent and mantissa value. As shown in FIG. 7B, the linear approximation uses 2 table values D and B and the value x in the last step in computing the positive sigmoid function value.

Figure 8:
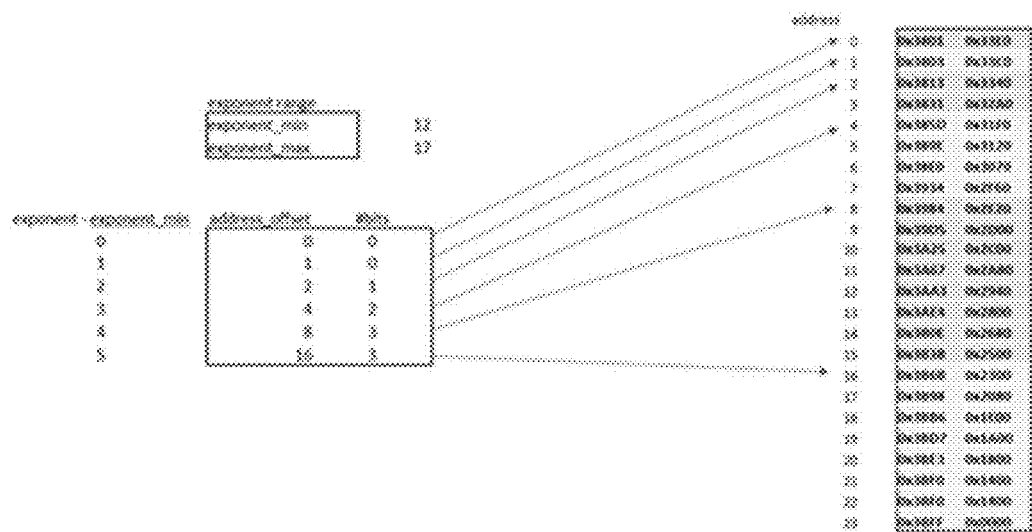
FIG. 8 depicts an example of a dynamic table with metadata descriptions and 6 exponent regions each having multiple mantissa values according to one aspect of the present embodiments.
Figure 9:
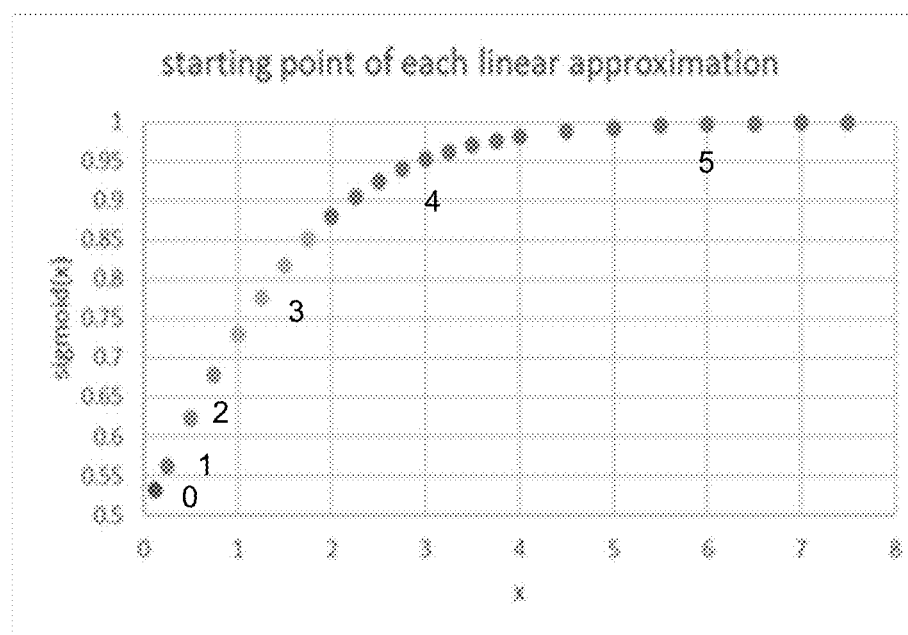
FIG. 9 depicts an example of piecewise approximation of the non-linear sigmoid function with multiple sub-regions within an exponent region dependent on the curvature of the region according to one aspect of the present embodiments.

In some embodiments, the tanh/sigmoid unit 614 is configured to perform both multiplication and addition of the sigmoid operation on floating point input values by utilizing a dynamic table that provides flexibility to cover multiple, e.g., up to 7 exponent regions/ranges and up to a total of 32 table entries. In some embodiments, the dynamic table is self-described with its meta data stored at the beginning of the table. FIG. 8 depicts an example of a dynamic table with metadata descriptions and 6 exponent regions each having 1024 mantissa values. In some embodiments, the number of support points within an exponent region is based on the curvature of the region to minimize the number of table entries. In some embodiments, the tanh/sigmoid unit 614 is configured to approximate the non-linear sigmoid function with 1, 2, 4, or 8 sub-regions within an exponent region dependent on the curvature of the region under piecewise approximation as depicted by the example in FIG. 9, wherein each sub-region is numbered. Depending on the curvature, the tanh/sigmoid unit 614 is configured to approximate the non-linear sigmoid function with 1, 2, 4, or 8 sub-regions within an exponent region, with each sub-region being represented as a table entry. In some embodiments, the sub-regions within an exponent region are equal in size, thus simplifying the index calculation. In some embodiments, the tanh/sigmoid unit 614 is configured to utilize the symmetry of the sigmoid function and obtain sigmoid(-x)=-sigmoid(x)+1 to obtain sigmoid function for negative input range.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A processing unit, comprising:
a post processing unit configured to
   accept and maintain one or more lookup tables for performing an operation;
   accept data from a set of registers configured to maintain output from a processing block instead of streaming the data from an on-chip memory (OCM);
   perform the operation on each element of the data from the processing block on a per-element basis via the one or more lookup tables; and
   stream post processing result of the per-element operation back to the OCM after the operation is complete.

2. The processing unit of claim 1, wherein:
the processing block is a matrix multiplication block, which is a two-dimensional array having X number of rows and Y number of columns, wherein the matrix multiplication block is configured to
   stream data of matrix A of X number of rows and Z number of columns and matrix B of Z number of rows and Y number of columns from the OCM;
   multiply matrices A and B to generate a matrix C of X number of rows and Y number of columns;
   accumulate multiplication result of matrices A and B in the set of registers;
   provide the multiplication result from the set of registers as the output to the post processing unit instead of streaming the multiplication result back to the OCM.

3. The processing unit of claim 2 further comprising one or more of:
an inline rectified linear unit (ReLU) configured to perform a rectified linear operation on the multiplication result; and
an inline quantization unit configured to perform a quantization operation on the multiplication result.

4. The processing unit of claim 1, wherein:
the post processing unit is configured to utilize multiple lookup tables to approximate the per-element operations based on numerical analysis.

5. The processing unit of claim 4, wherein:
the post processing unit is configured to
   divide the operation into multiple sections, where each section is represented by a curve that is extrapolated based on one lookup table of the lookup tables; and
   determine a value of the operation by referencing a specific lookup table corresponding to a section associated with an input value.

6. The processing unit of claim 1, wherein:
the post processing unit is configured to utilize a single lookup table to implement the operation for integer input values by utilizing the operator symmetries and relationship of the operation.

7. The processing unit of claim 1, wherein:
the post processing unit is configured to implement the operation for floating point input values as a piece-wise linear approximation for a positive input range with a lookup table based on the exponent and mantissa values of the floating point input values.

8. The processing unit of claim 7, wherein the operation is tanh
operation and wherein:
the post processing unit is configured to represent the tanh operation using the sigmoid operation so that only a single table representing a sigmoid operation is needed.

9. The processing unit of claim 7, wherein:
the post processing unit is configured to divide positive region of the operation into one or more of path-through, lookup and saturation regions for floating input values.

10. The processing unit of claim 7, wherein:
the post processing unit is configured to utilize symmetry of the operation for the negative input range.

11. The processing unit of claim 7, wherein the operation is a
sigmoid operation and wherein:
the post processing unit is configured to perform both multiplication and addition of the sigmoid operation on floating point input values by utilizing a dynamic table that covers multipole exponent regions and table entries, wherein number of support points within an exponent region is based on the curvature of the region to minimize the number of table entries.

12. The processing unit of claim 11, wherein:
the post processing unit is configured to approximate the operation with multiple sub-regions within each exponent region dependent on the curvature of the exponent region under piecewise approximation.

13. The processing unit of claim 1, wherein the operation is a tanh operation.

14. The processing unit of claim 1, wherein the operation is a sigmoid operation.

15. A method, comprising:
accepting and maintaining one or more lookup tables for performing an operation;
receiving data from a processing block;
performing the operation on each element of the data on a per-element basis via the one or more lookup tables; and
streaming post processing result of the per-element operation to an on-chip memory (OCM) after the operation is complete.

16. The method of claim 15, further comprising:
utilizing multiple lookup tables to approximate the per-element operations based on numerical analysis.

17. The method of claim 16, further comprising:
dividing the operation into multiple sections, where each section is represented by a curve that is extrapolated based on one lookup table of the lookup tables; and
determining a value of the operation by referencing a specific lookup table corresponding to a section associated with an input value.

18. The method of claim 15, further comprising:
utilizing a single lookup table to implement the operation for integer input values by utilizing the operator symmetries and relationship of the operation.

19. The method of claim 15, further comprising:
implementing the operation for floating point input values as a piece-wise linear approximation for a positive input range with a lookup table based on the exponent and mantissa values of the floating point input values.

20. The method of claim 19, wherein the operation is a tanh
operation, and wherein the method further comprises:
representing the tanh operation using a sigmoid operation so that only a single table representing the sigmoid operation is needed.

21. The method of claim 19, further comprising:
dividing positive region of the operation into one or more of path-through, lookup and saturation regions for floating input values.

22. The method of claim 19, further comprising:
utilizing symmetry of the operation for the negative input range.

23. The method of claim 19, further comprising:
performing both multiplication and addition of the operation on floating point input values by utilizing a dynamic table that covers multipole exponent regions and table entries, wherein the number of support points within an exponent region is based on the curvature of the region to minimize the number of table entries.

24. The method of claim 23, further comprising:
approximating the non-linear operation with multiple sub-regions within each exponent region dependent on the curvature of the exponent region under piecewise approximation.

25. A processing unit, comprising:
a means for accepting and maintaining one or more lookup tables for performing an operation;
a means for receiving data from a processing block;
a means for performing the operation on each element of the data on a per-element basis via the one or more lookup tables; and
a means for streaming post processing result of the per-element operation to an on-chip memory (OCM) after the operation is complete.

26. The processing unit of claim 25, further comprising:
a means for utilizing multiple lookup tables to approximate the per-element operations based on numerical analysis.

27. The processing unit of claim 26, further comprising:
a means for dividing the operation into multiple sections, where each section is represented by a curve that is extrapolated based on one lookup table of the lookup tables; and
a means for determining a value of the operation by referencing a specific lookup table corresponding to a section associated with an input value.

28. The processing unit of claim 25, further comprising:
a means for utilizing a single lookup table to implement the operation for integer input values by utilizing the operator symmetries and relationship of the operation.

29. The processing unit of claim 25, further comprising:
a means for implementing the operation for floating point input values as a piece-wise linear approximation for a positive input range with a lookup table based on the exponent and mantissa values of the floating point input values.

30. The processing unit of claim 29, wherein the operation is a
tanh operation, and wherein the method further comprises:
a means for representing the tanh operation using a sigmoid operation so that only a single table representing the sigmoid operation is needed.

31. The processing unit of claim 29, further comprising:
a means for dividing positive region of the operation into one or more of path-through, lookup and saturation regions for floating input values.

32. The processing unit of claim 29, further comprising:
a means for utilizing symmetry of the operation for the negative input range.

33. The processing unit of claim 29, further comprising:
a means for performing both multiplication and addition of the operation on floating point input values by utilizing a dynamic table that covers multipole exponent regions and table entries, wherein the number of support points within an exponent region is based on the curvature of the region to minimize the number of table entries.

34. The processing unit of claim 33, further comprising:
a means for approximating the non-linear operation with multiple sub-regions within each exponent region dependent on the curvature of the exponent region under piecewise approximation.

\* \* \* \* \*